United States Patent [19]
Zimmerman et al.

[11] Patent Number: 5,423,991
[45] Date of Patent: Jun. 13, 1995

[54] METHOD TO RECOVER PETROLEUM FROM SLICKS AND SPILLS

[76] Inventors: Edwin H. Zimmerman, 465 Farmersville Rd., New Holland, Pa. 17557; Percy N. Glynn, P.O. Box 130, Fayetteville, Pa. 17222

[21] Appl. No.: 130,837

[22] Filed: Oct. 4, 1993

Related U.S. Application Data

[60] Division of Ser. No. 945,950, Sep. 17, 1992, Pat. No. 5,262,048, which is a continuation-in-part of Ser. No. 727,056, Jul. 8, 1991, abandoned.

[51] Int. Cl.[6] .............................................. E02B 15/04
[52] U.S. Cl. .................................. 210/671; 210/680; 210/693; 210/924
[58] Field of Search ............ 210/671, 680, 693, 242.4, 210/924

[56] References Cited

U.S. PATENT DOCUMENTS

| | | | |
|---|---|---|---|
| 2,367,384 | 1/1945 | Tymstra et al. | 210/680 |
| 3,657,125 | 4/1972 | Strickman | 210/40 |
| 3,681,237 | 8/1972 | Orban et al. | 210/680 |
| 3,739,913 | 6/1973 | Bogosian | 210/489 |
| 3,763,621 | 10/1973 | Klein et al. | 53/24 |
| 3,886,067 | 5/1975 | Miranda | 210/40 |
| 3,888,766 | 6/1975 | De Young | 106/2 |
| 3,976,570 | 8/1976 | McCray | 233/25 |
| 4,096,700 | 6/1978 | Muramatsu | 61/1 F |
| 4,120,788 | 10/1978 | Ellis | 210/40 |
| 4,188,155 | 2/1980 | Langermann | 405/63 |
| 4,234,420 | 1/1980 | Turbeville | 210/671 |
| 4,366,067 | 12/1982 | Golding et al. | 210/671 |
| 4,389,357 | 6/1983 | Chu et al. | 264/40.1 |
| 4,567,820 | 2/1986 | Munsell | 100/65 |
| 4,645,376 | 2/1987 | Simpson | 405/63 |
| 5,009,790 | 4/1991 | Bustamante | 210/689 |

*Primary Examiner*—Ivars Cintins
*Attorney, Agent, or Firm*—Aquilino & Welsh

[57] ABSTRACT

This invention comprises an apparatus or mechanism and a method of using it to recover petroleum from a floating slick or spill by means of absorbing the petroleum in powder particles principally comprising a reaction product of polyurethane, a catalyst, and a strong cationic polymer comprising an agent which produces a foam product that has a strong affinity for combining physically with petroleum resembling a magnetic attraction between the same. The reaction product is formed into desired sizes of elongated block-like shapes which are fed to a shredding assembly of saw blades that reduce the solid shapes into irregularly-shaped powder particles that are capable of being used in at least two ways to attract and adsorb petroleum by bonding. One way is to employ a porous boom of substantial diameter and length that is used to at least partially enclose a predetermined area of the slick or spill, the particle content of the boom absorbing adjacent petroleum. A second way of using the particles is to discharge them from a blower or otherwise dispose them onto the area of slick which is partially or completely surrounded by the boom to permit the particles to absorb the area of the slick subtended by the boom into the deposited particles, either with the boom also absorbing the petroleum or not. The adsorbed particles then are moved to a conveyor on a ramp which moves them to a high-powered centrifuge that operates at high speeds that are capable of breaking the attraction or bond of the particles to the petroleum and thereby separates the petroleum for recovery thereof and renders the released particles available for reuse.

12 Claims, 15 Drawing Sheets

METHOD TO RECOVER PETROLEUM FROM SLICKS AND SPILLS

This application is a division of Ser. No. 07/945,950, filed Sep. 17, 1992, now U.S. Pat. No. 5,262,048, which was a continuation-in-part of Ser. No. 07/727,056, filed Jul. 8, 1991, now abandoned.

BACKGROUND OF THE INVENTION

This invention pertains to apparatus and a method by which petroleum slicks or spills floating upon or contained in bodies of water may be recovered for further processing into commercial materials, such as gasoline, fuel oil, lubricating oils and many other related products. The petroleum may be floating on sea water, for example, or coating the bed of a body of water or the shore of such body, and recovered therefrom.

Other materials and methods have been developed previously and over which the present invention represents a meritorious improvement. The following patents are submitted as representative of the pertinent prior art in this field of operation:

U.S. Pat. No. 3,657,125—Strickmen Apr. 18, 1972
U.S. Pat. No. 3,739,913—Bogosian Jun. 19, 1973
U.S. Pat. No. 3,763,621—Klein et al Oct. 9, 1973
U.S. Pat. No. 3,886,067—Miranda May 27, 1975
U.S. Pat. No. 3,888,766—De Young Jun. 10, 1972
U.S. Pat. No. 3,976,570—McCray Aug. 24, 1976
U.S. Pat. No. 4,096,700—Muramatsu Jun. 27, 1978
U.S. Pat. No. 4,120,788—Ellis Oct. 17, 1978
U.S. Pat. No. 4,188,155—Langermann Feb. 12, 1980
U.S. Pat. No. 4,234,420—Turbeville Nov. 18, 1980
U.S. Pat. No. 4,366,067—Golding et al Dec. 28, 1982
U.S. Pat. No. 4,389,357—Chu et al Jun. 21, 1983
U.S. Pat. No. 4,567,820—Munsell Feb. 4, 1986
U.S. Pat. No. 4,645,376—Simpson Feb. 24, 1987
U.S. Pat. No. 5,009,790—Bustamante. Apr. 23, 1991

SUMMARY OF THE INVENTION

It is the principal object of the present invention to utilize a powder-like resin version of certain polyurethanes, one of which contains a catalyst, and these are reacted with a commercial polyquaternary amine product, sold under the tradename "Chemlink 6360". This reaction product forms a solid foam which is ground to a suitable fineness to produce particles that have a strong affinity for attracting and physically attaching to petroleum somewhat in the nature of a magnetic bond for petroleum, commonly referred to as "oil", and such bond is so strong that separation of the "oil" from the powder particles can be achieved only by very strong centrifugal forces such as produced by a centrifuge operating at speeds of, for example, between 10,000 and 20,000 r.p.m.

It is the overall object of the present invention to utilize the above-described modified polyurethane which, in accordance with the present invention, is formed into a block-like member of certain useful lengths and cross-sections which are operated upon by disintegrating means, such as rotary saws, to produce small irregular shapes of resin powder particles having a capacity to adsorb and strongly attract and bond to petroleum, or "oil", up to as much as sixteen times its own weight, depending upon the viscosity of the petroleum.

Another object of the invention, which is related to the foregoing object, is to utilize said modified polyurethane powder particles in several manners. One manner is to encase said powder in a large porous flexible tube or sheath of woven or mesh, preferably synthetic resin, of suitable strength and diameter, and an extensive predetermined length is formed into a boom which floats upon water, upon or in which a petroleum oil slick is disposed, for purposes of substantially surrounding or subtending an area of said slick and adsorbing and strongly attracting and separably bonding the petroleum of the slick to said powder particles for purposes of recovering the petroleum from the water.

A second manner of using said particles is to blow predetermined amounts of said powder particles, either in newly produced form or used form, from which petroleum has been removed, over an area of said slick, such as by powerful blowers and nozzles to distribute the powder over the slick and permit the powder to attract and attach or bond the petroleum to the particles of powder.

Still another object of the invention is to fill said aforementioned casing, which is tube-like and porous, with said powder by means of an auger of suitable size, and of which the spiral blades preferably are relatively thin, and operating said auger at suitable rotational speed, while reciprocating the same to a limited degree axially within a rigid filling tube, upon and along the exterior of which said porous casing is progressively formed, the operation of said auger progressively filling said casing to a desired degree as the casing is formed.

Relative to the foregoing object, a related object is to form the boom casing from a strip of suitable width of porous thermoplastic material of predetermined length coiled into a roll and progressively feeding it to a forming unit having a heater to seal edges of said strip together to form a tubular casing and, as formed, feeding the casing to the discharge of the auger and filling the casing, as formed, with the powder particles.

A still further object of the invention is to provide a barge or other suitable marine vessel upon which one or more preferably large-capacity centrifuges are operable to receive the petroleum-adsorbed powder particles by suitable feeding means upon said vessel, such as an inclined conveyor, of preferably large capacity, which receives the adsorbed powder particles which the boom at least partially surrounds or subtends, as well as that which is encased within said boom and which is gradually fed to said conveyor by progressively opening said casing to expose the saturated powder therein. Progressively moving the ends of said casing of the boom forwardly into the spill, such as by tugboats, and also progressively move the floating barge and the surrounded or subtended saturated powder particles toward said conveyor, whereby substantially all of the petroleum-adsorbed powder particles are fed progressively to said centrifuges for separation of the petroleum or "oil" from said powder particles.

The separated petroleum then is delivered directly to a tank or otherwise, alongside the aforementioned vessel, for example, and the powder particles from which the petroleum has been separated by said centrifuges are ready for reuse by returning it, for example, to a reformed boom casing made from the open casing that has just been emptied, thus minimizing cost. The casing which has been opened may be rendered tube-like by heat-sealing overlying edges of the opened casing or by stitching the longitudinal edges with heavy Nylon thread, for example.

One other object of the invention is to capture any portion of an oil or petroleum slick that has become deposited upon a shore area or has sunk to the bed of the water upon which it floated previously, by means of agitating such deposits, for example, by the use of strong jets of water applied by hydraulic power against such deposits to agitate the Same while spreading said aforementioned powder particles upon the aforementioned agitated deposits in or on the water to adsorb the petroleum thus agitated and then retrieving the adsorbed powder particles either by a boom encircling the same while agitated or otherwise and subsequently delivering the resulting material to a centrifuge.

Still another object of the invention is to move masses of distributed powder particles, disposed on the slick, which have adsorbed at least part of the slick by engaging the same with a floating section of the porous powder particle-containing boom, while opposite ends of said boom, are pulled respectively with a barge by means of tugboats or the like attached to said ends of a boom, thereby forcing the floating powder particles and adsorbed petroleum toward a wide inclined ramp on one end of said barge and upon which a conveyor of transversely-spaced endless chains or the like are arranged with crossbars having transversely-spaced upstanding prongs fixedly attached thereto and operable to engage the moving mass of petroleum-saturated powder particles and force it up said ramp for delivery to centrifuges, while any water in the mass drains through perforations in the ramp.

One other object of the invention, related to the foregoing object, is to move said ends of the boom progressively toward means to open said boom by slitting it longitudinally as said boom reaches said ramp, progressively to expose the petroleum-saturated particles therein for discharge to said ramp, and further including means to connect the slit edges of said boom to re-establish it in flexible tubular form for reuse.

Still another important object of the invention is to include longitudinally in the porous boom, a cable of insufficient diameter and strength to sustain the load imposed upon it when said boom and the barge connected to it are being towed by tugboats or the like connected respectively to the ends of said boom when embracing an area of the spill or slick between the opposite side lengths of mid boom.

Details of the foregoing objects, as well as other objects thereof, are set forth below or illustrated in the attached drawings comprising a part thereof.

DETAILED DESCRIPTION OF THE PREFERRED EMBODIMENTS OF THE INVENTION

The system and apparatus comprising the present invention which are adapted to recover petroleum spills, either while floating upon a body of water or disposed on a shore or bed of a body of water, are illustrated on the above-described figures of the drawings and description of the details thereof is as follows:

The principal units and devices, as well as the system, of the invention primarily are intended to be mounted upon a marine vessel, such as a scow 10, which is intended to float upon the body of water from which the spill is to be recovered. To effect operation of the system and apparatus, and referring to FIG. 1, it will be seen that the scow 10 is propelled in a forward direction by a pair of suitable power means, such as tugboats 12. The scow 10 is connected to the tugboats preferably by substantial lengths of booms 14 which each comprise a tubular configuration of predetermined length and, for example, of suitable diameter, such as between three and four feet. There is available on the market certain types of mesh sheeting formed of synthetic, preferably thermoplastic resins, and in which sheeting the substantially uniform size of perforations are of the order of 1/16 to ⅛ inch in diameter. These perforations are for the purpose of permitting ingress of petroleum, as well as draining of water while particles of reacted polyurethane material adsorb the petroleum from a spill and attach the same strongly thereto by means not only of adsorption but also by an unusually strong bonding force, which is the distinctive characteristic of the particles referred to above and described in detail hereinafter.

FORMATION OF ADSORPTIVE PARTICLES

Figure 5:
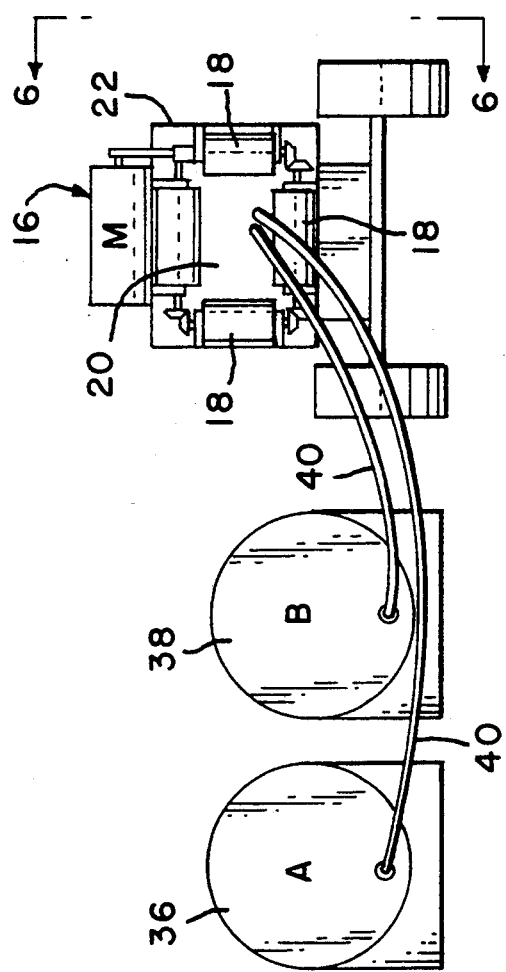
FIG. 5 is an end view of certain elements of FIGS. 2, 3, 6 and 7.
Figure 6:
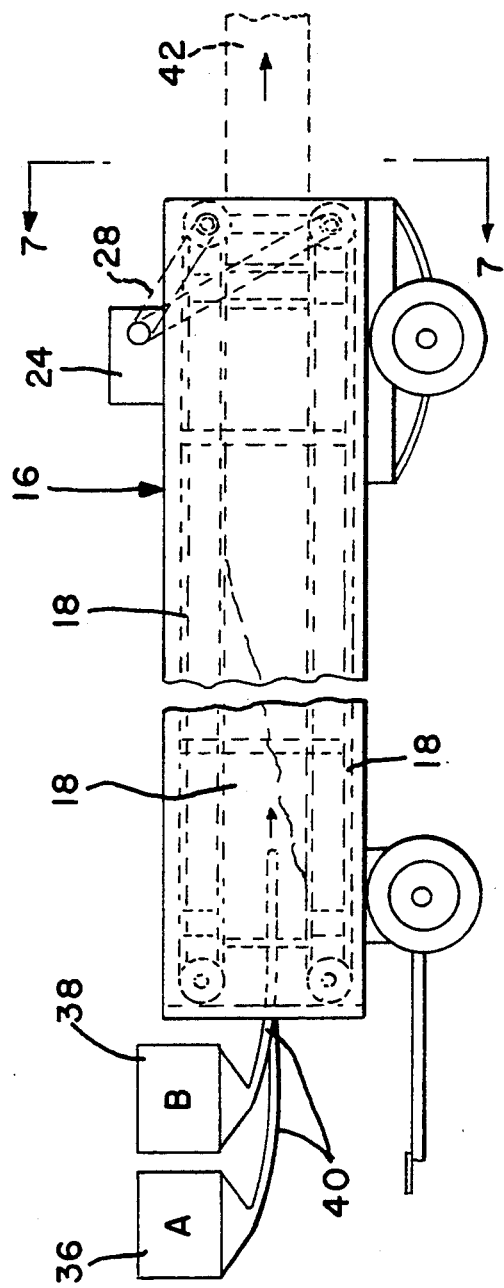
FIG. 6 is a side elevation of the elements of FIG. 5.
Figure 7:
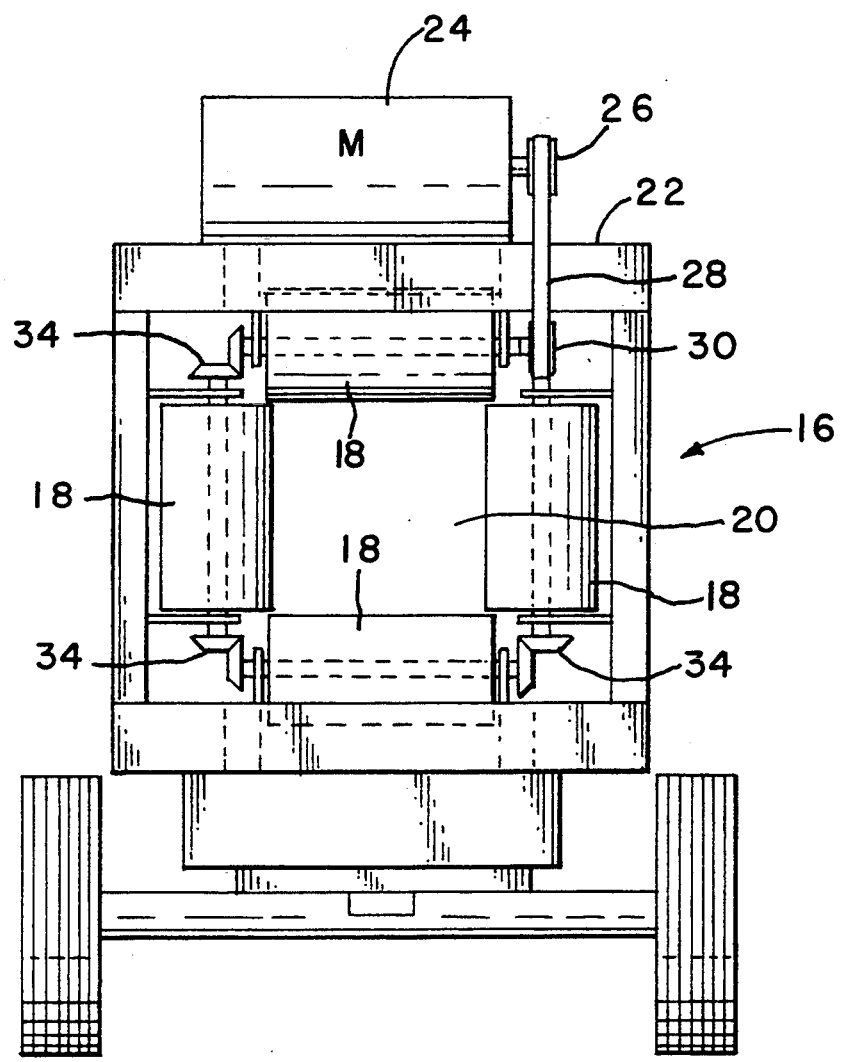
FIG. 7 is an enlarged view of part of FIG. 5.
Figure 8:
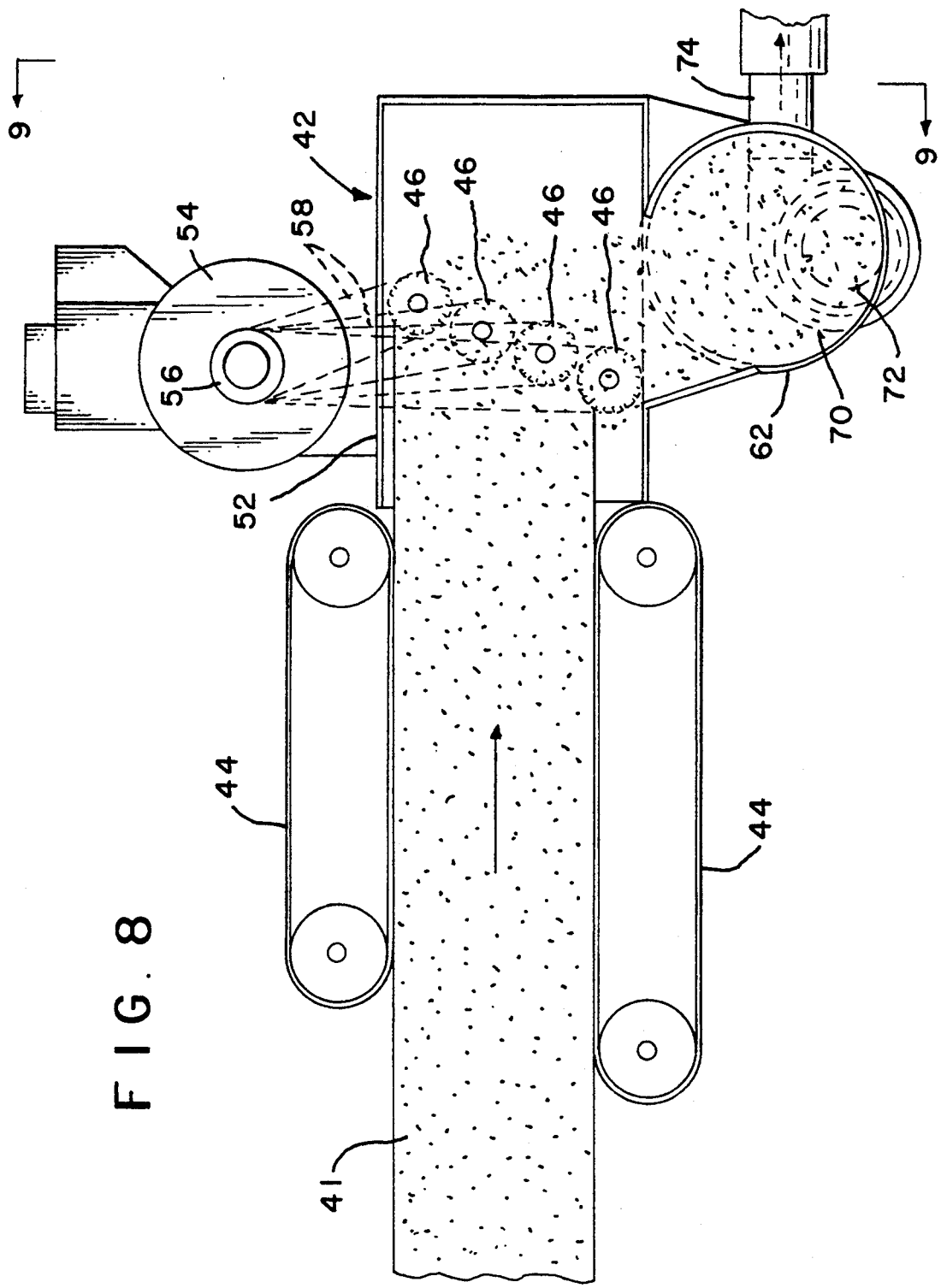
FIG. 8 is a side elevation of FIG. 9 as seen from the right-hand side thereof.

Referring particularly to FIGS. 5–7, a unit 16, which is illustrated as being mobile, but which may be stationary, if desired, comprises a housing containing a series of four impervious belts 18 which are mounted upon a suitable frame and are so disposed that the inner surfaces thereof define a rectangular space 20, the inlet end of which is shown particularly in FIGS. 5 and 7. The frame 22 supports a motor 24 that has a drive pulley or gear 26 around which a belt or chain 28 extends and also extends around another pulley or gear 30 that is affixed to one end of a shaft 32 to drive, for example, the uppermost belt 18 and drive also, by a series of pairs of bevel gears 34, all of the belts 18. The inner surfaces thereof, which define a rectangular space 20, move in a common direction from the inlet end, shown in FIGS. 5 and 7, to the opposite discharge end.

Referring to FIGS. 5 and 6, the system also includes at least a pair of tanks 36 and 38, which each have a conduit 40 extending from each tank into the inlet end of space 20. While the belts 18 are moving in feeding direction from the inlet end of said space, the fluid material discharging from tanks 36 and 38 becomes mixed within the space 20.

For a specific example, on a small scale of the reaction and product, it comprises mixing from tank 36, two (2) quarts of a commercial type of polyurethane, sold under the tradename Isofoam Mo 16255A and one and one-half (1½) quarts of another type of polyurethane, sold under the tradename Isofoam Mo 16255B. These are mixed with 126 grams of a polyquaternary amine and a catalyst from tank 38, which is sold under the tradename Chemlink 6360. These ingredients are mixed rapidly for twenty seconds and poured into a mold in which they rise for a period of 30 seconds. The mixture then is left to cure for at least 1½ hours to form a solid product which then is disintegrated into powder particles. The prime reactant is the Chemlink 6360. This product may be formed in larger quantities on the same ratio as above. The powder particles thus formed have been found to possess a strong affinity for petroleum that somewhat resembles a positive magnetic charge. Further, one gram of the powder particles has been observed to adsorb about 2 grams of water and at least 10 grams of petroleum. Also, no fish mortality has been observed relative to this powder per se, and very low mortality was observed in the mixed powder and petroleum relative to fish.

The foregoing ingredients are of a somewhat syrupy consistency and by providing suitable sealing strips for the mixture relative to the belts 18 shown in FIGS. 5-8, the desired solid may be formed at least in batch lots. It will be understood that the edges of the belts 18, which define the rectangular space 20, preferably are close to each other in order to contain the supply from the tanks 36 and 38 while the same is introduced into the space 20 wherein the two compositions react with each other and form a foam product, which, upon curing, forms a rectangular block 41, see FIG. 6 in phantom, which is cut into desired lengths to form a supply of blocks of solid porous resinous material. These blocks are then disintegrated into powder form by the disintegrating unit 42, details of which are best shown in FIGS. 9 and 10 and to which attention is now directed.

FOAM BLOCK DISINTEGRATING UNIT

Figure 9:
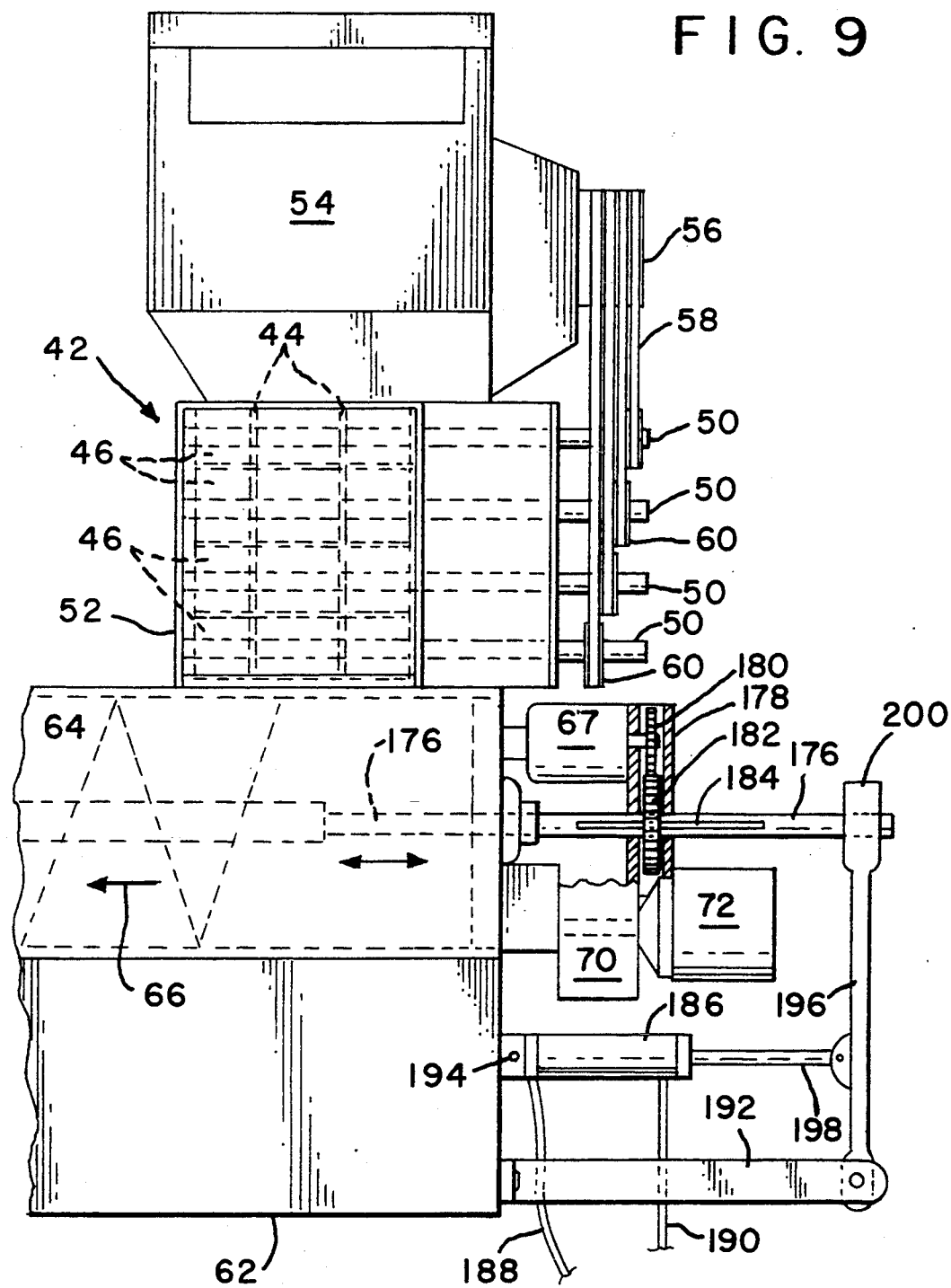
FIG. 9 is a partly fragmentary end view of FIG. 8 as seen from the left-hand end thereof.
Figure 10:
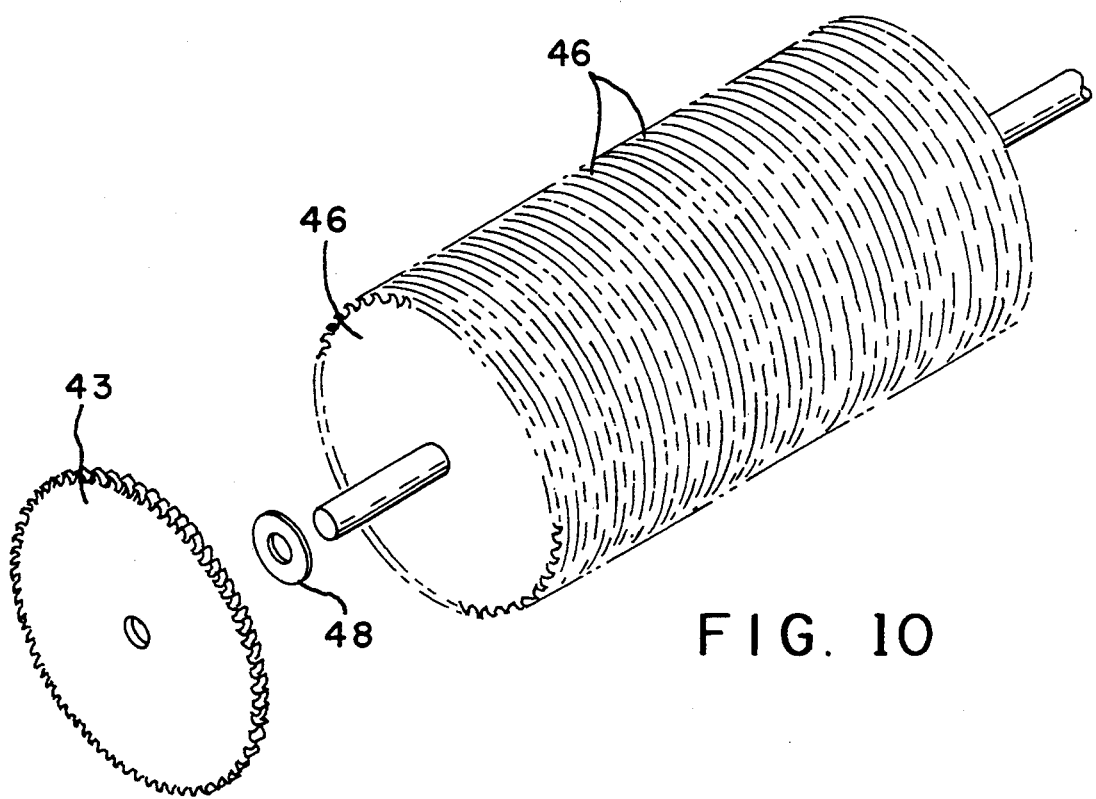
FIG. 10 is a partly exploded perspective view of the saw assembly of FIGS. 8 and 9.
Figure 11:
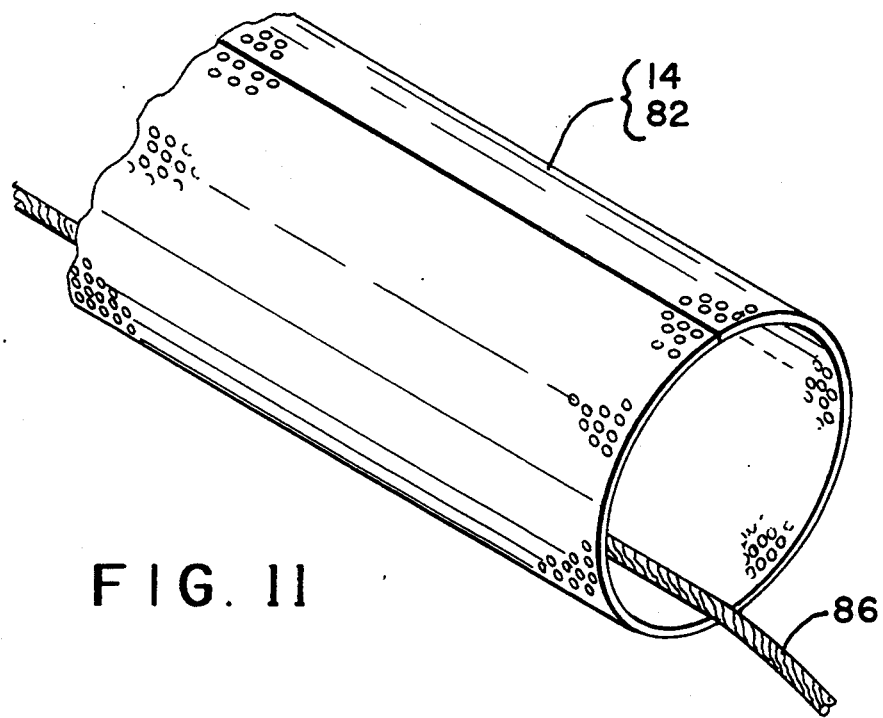
FIG. 11 is a fragmentary perspective view of a section of porous boom casing and cable member of the invention.
Figure 12:
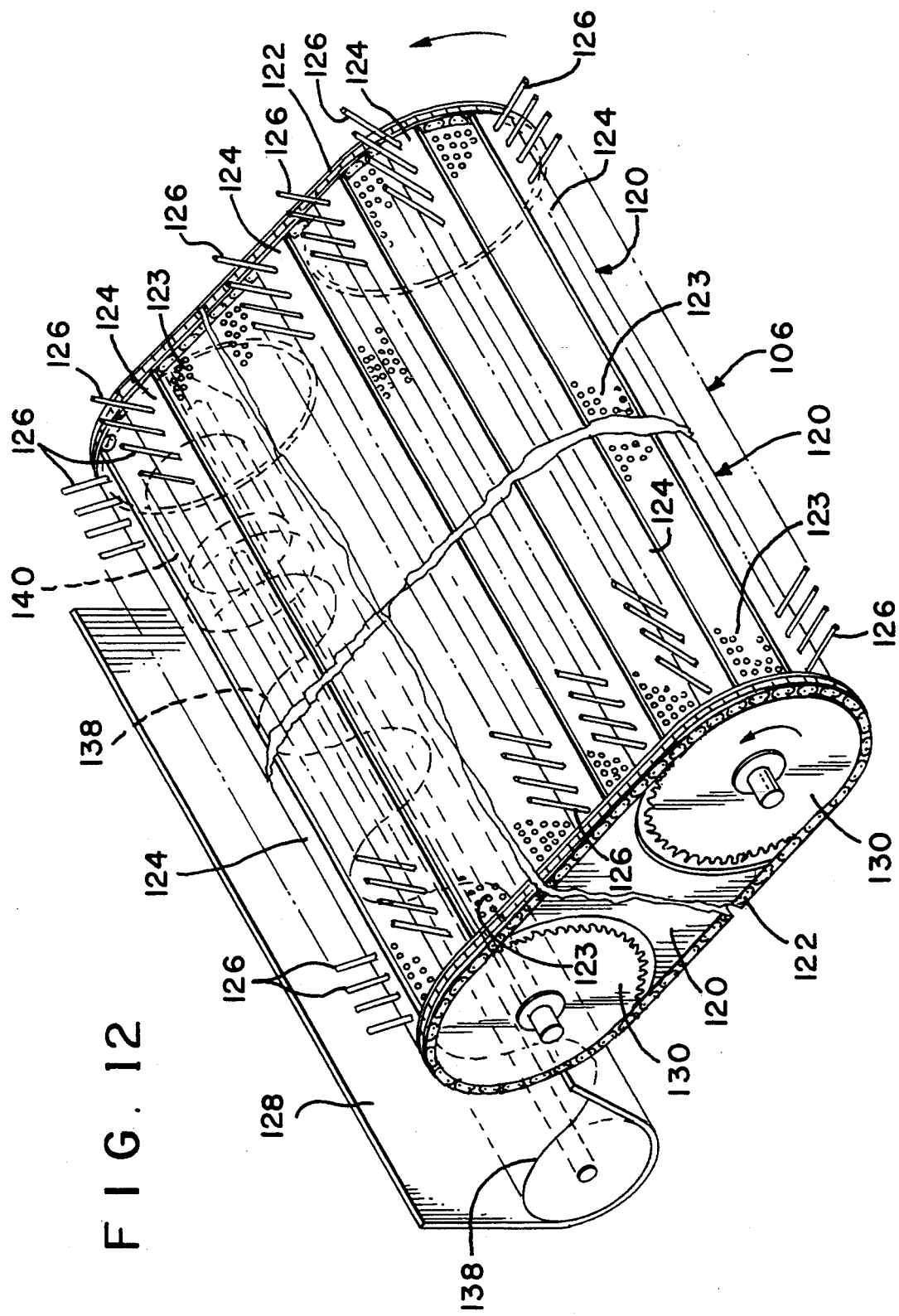
FIG. 12 is a fragmentary perspective view of the ramp and conveyor to feed petroleum-saturated particles to a centrifuge.

The disintegrating unit 42 comprises a pair of belts 44, best shown in FIG. 9, which are suitably mounted upon a frame, not shown, and operate to feed block 41 toward the assembly of saws 46 which actually are mounted in gang form, as shown in exemplary manner in FIG. 11. These saws can be between one foot and two feet in diameter, depending on the size of the blocks, and the same are preferably separated slightly from each other by means of a washer 48 of, for example, .030 inches in thickness, or larger, and the teeth of all the saws extend in the same direction. The saws are mounted upon a suitable shaft 50 and the shafts of all of the same are supported in suitable anti-friction bearings, not shown, within frame 52.

The frame 52 supports a power unit 54, such as an electric motor of suitable output, which drives a sheave 56, and a pulley wheel which, by means of belts 58, drives corresponding pulleys 60 on the shafts 50.

The simultaneous operation of the saws 46 progressively disintegrates the block 41 into powder form, as shown in FIG. 9, which is discharged into housing 62 within which an auger 64 is rotatably supported and is driven by suitable power means, such as motor 67, see FIG. 9, that operates the auger to move the powder material in the direction of the arrow 66 to effect feed of the powder material to a boom-forming unit 68, shown in detail in FIG. 14, and described hereinafter.

Associated with housing 62 and auger 64 is a blower unit 70 in which the propeller, not shown, is driven by a motor 72 in a direction to discharge the powder material from the outlet 74 to deliver the powder material to means to distribute the powder material upon the surface of a spill as described hereinafter. The principal function of auger 64 is to fill a porous boom through the use of the unit 68, now to be described.

Figure 14:
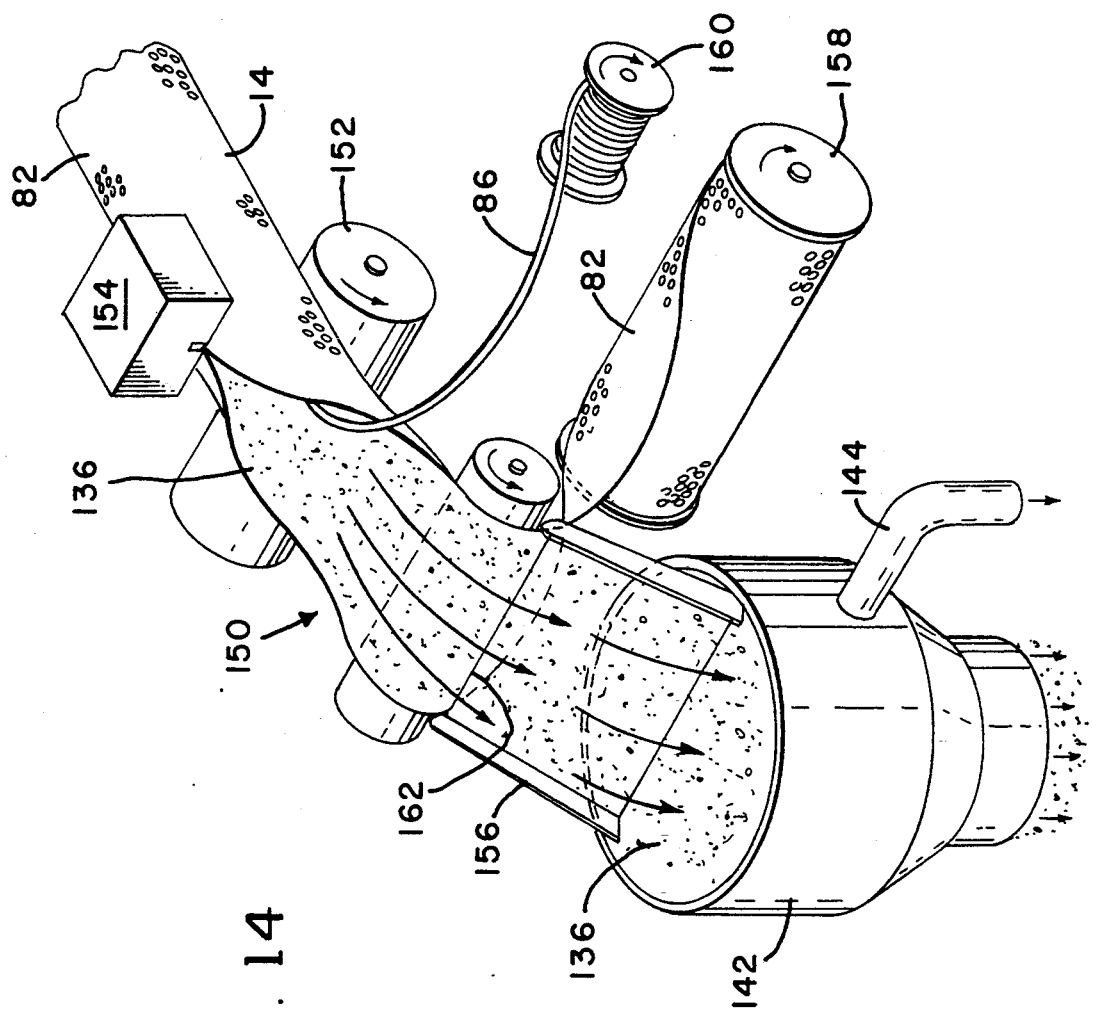
FIG. 14 is a fragmentary perspective view of the boom-emptying unit for delivering petroleum-saturated particles to a centrifuge.

A coiled roll 76 of predetermined length of porous sheet plastic or synthetic resin material 78 preferably is thermoplastic in order that opposite edges thereof, when disposed in tubular configuration, as shown in FIG. 14, near the left-hand end thereof, may be connected by means of heat sufficient to stick said edges together. The heating unit 80 accomplishes such connection at appropriate temperatures. As an alternative, the unit 80 also may comprise a simple sewing machine unit adapted to connect the edges of the material 78 by means of stitching, comprising relatively heavy thread composed of strong synthetic resin, such as sold under the tradename "NYLON". As shown in FIG. 14, as the edges of the sheet 78 are connected to form a tube 82, which is of porous synthetic thermoplastic resin which, when filled with petroleum adsorbing particles of synthetic resin, comprises the boom.14. The powdered particles of adsorbing material formed from the block 41 by the saws 46, are discharged from the opening 84, shown in phantom, in the lower part of frame 52, where the particles are engaged by the auger 64 within the housing 62 and around which the tube 82, comprising the boom cover, is supported and slidably moves in the direction of the arrow 84. Incident to forming the boom tube 82, an indefinite length of cable 86 is delivered from a coil supply thereof, not shown, and is directed to the interior of the tube 82, thus formed, as described, to withstand a tensile stress placed upon the tube 82 when the tube 82 is transformed into the floating boom 14, shown in FIG. 1, the same being filled with the powdered adsorptive and magnetically-attractive particles formed by the disintegrating unit 42.

POWDER DISTRIBUTING SYSTEM

Figure 1:
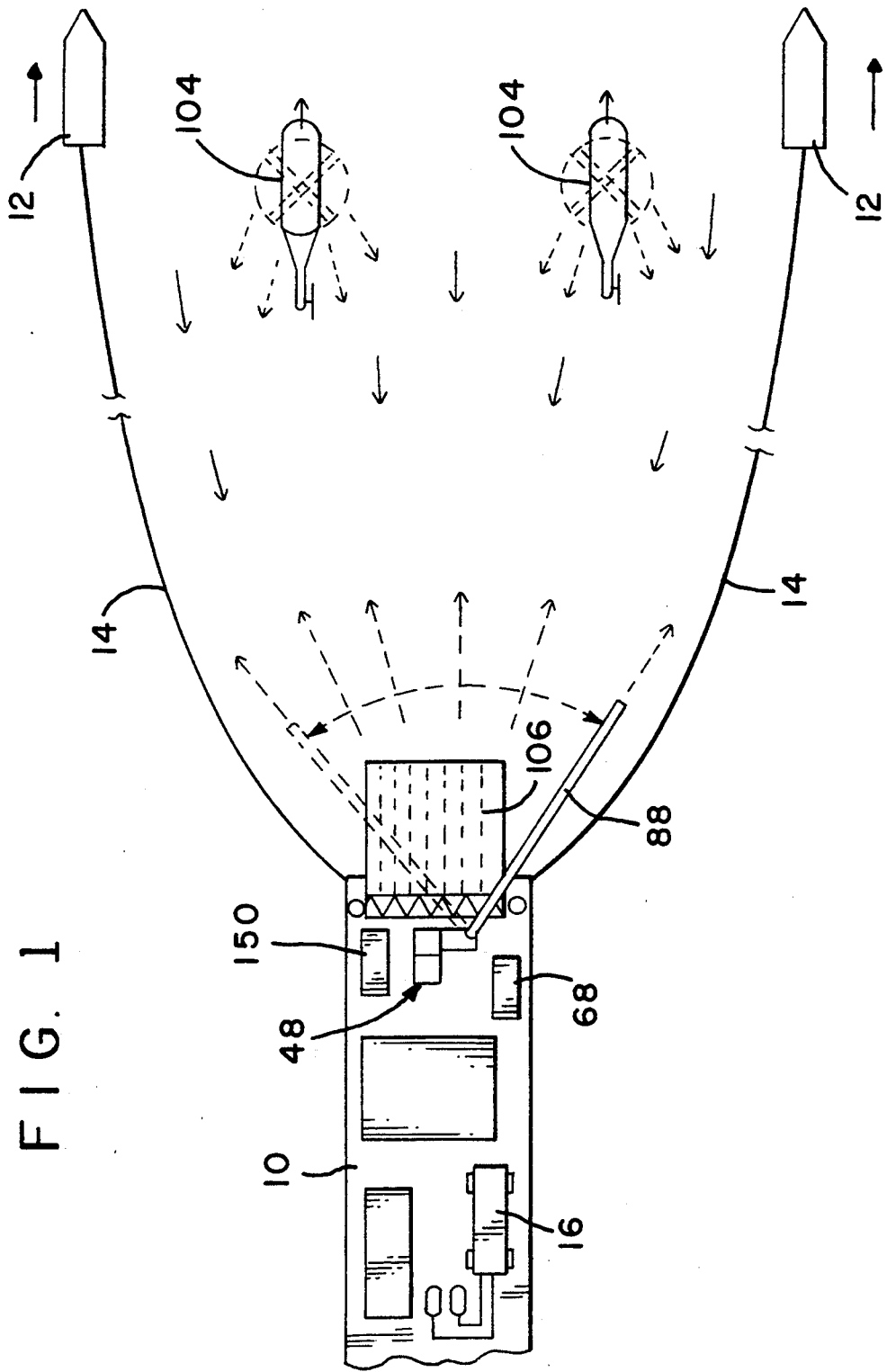
FIG. 1 is a plan view of a system and mechanism by which petroleum can be recovered from a slick or spill thereof.
Figure 2:
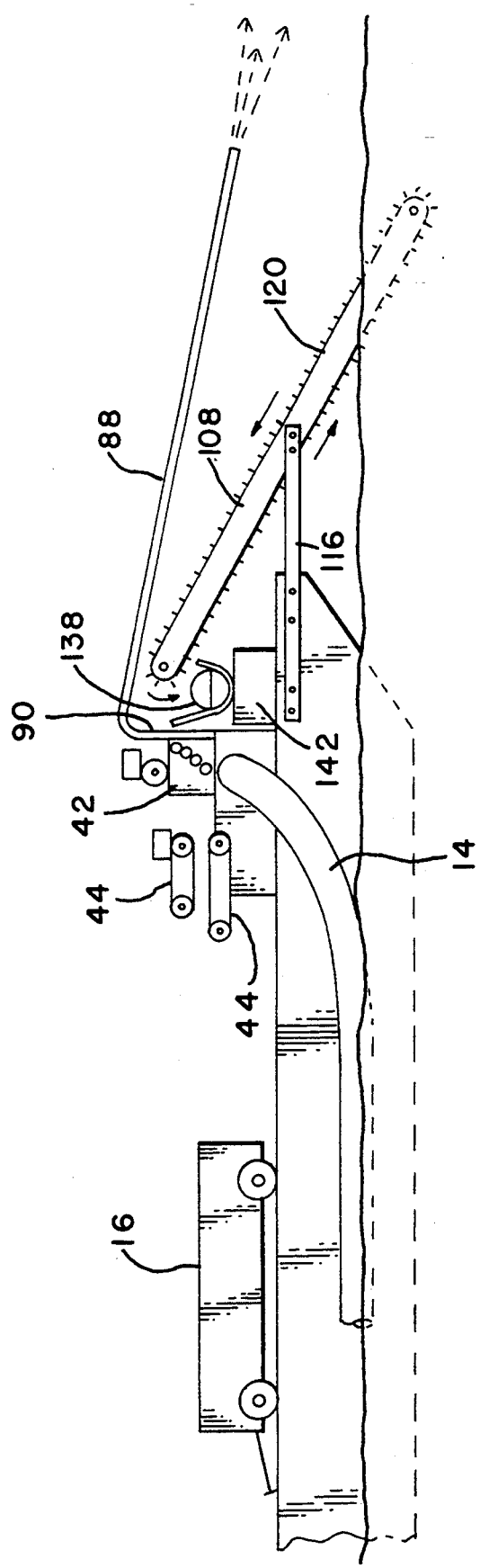
FIG. 2 is a side elevation of the system and mechanism shown in FIG. 1.
Figure 18:
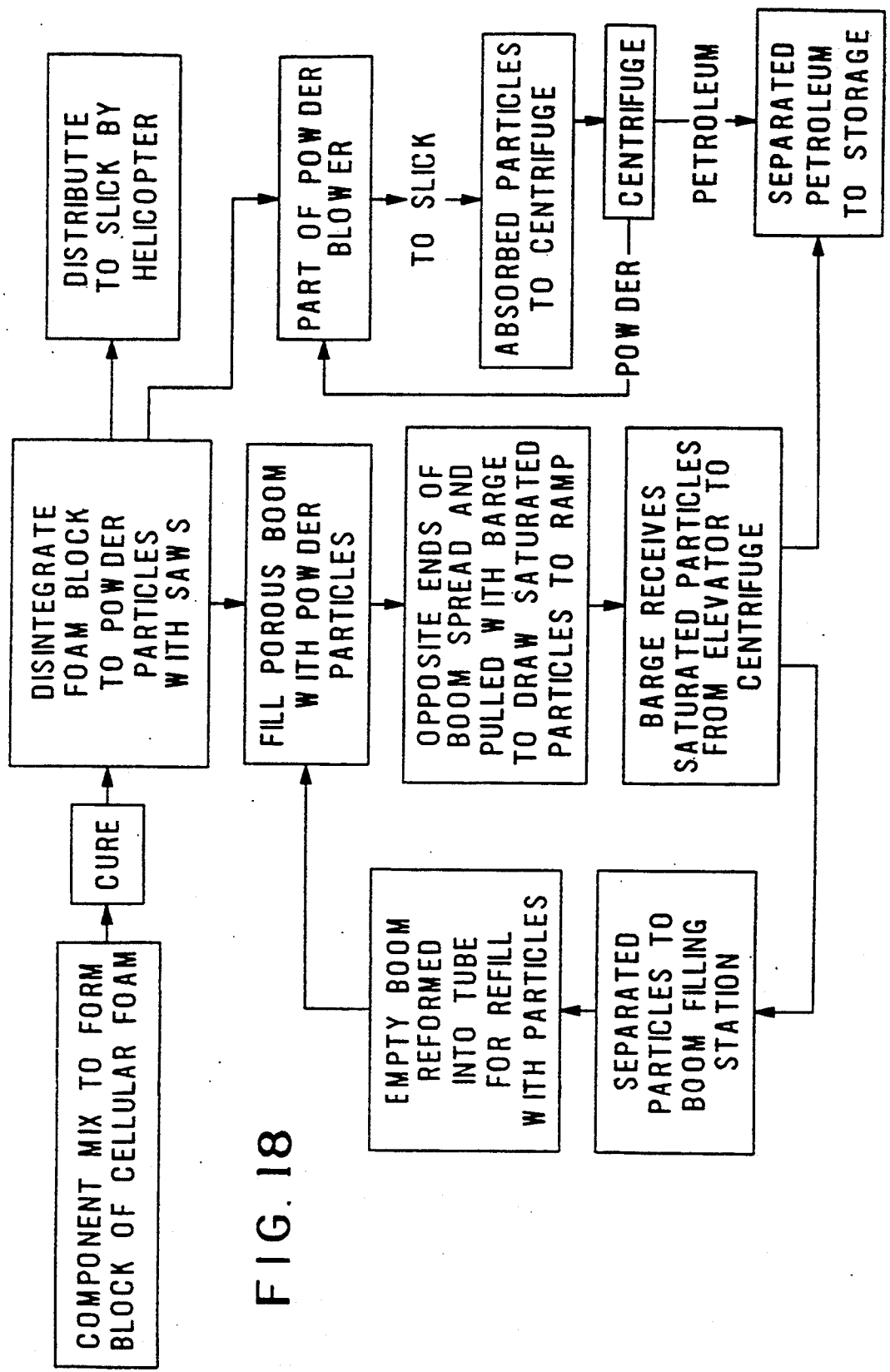
FIG. 18 is a diagrammatic layout of the overall process by which petroleum is recovered from a spill thereof on a body of water.

Referring to FIGS. 1 and 18, it will be seen that an elongated tubular nozzle 88 of rigid construction of suitable material, preferably metal, has an upstanding portion 90, which is connected to and is supported by a base member 92, which is oscillatably-supported by the fragmentary section 94 of the deck of barge 10. Base member 92 has a forked projection 96 integral therewith and extending radially, as shown in FIG. 18. A preferably electric motor 98 also is supported by the deck 94 and has a rotating member 100 upon which an eccentric pin 102 is affixed and is engagable with the slot of the forked member 96, whereby, upon rotation of the member 100, oscillation of the projecting and preferably downwardly-extending nozzle 88 is effected for purposes of distributing the powder material generated by the disintegrating unit 42, such oscillation being illustrated by dotted lines in FIG. 1.

Referring particularly to FIGS. 9 and. 10, reference is made to the blower unit 70, which is operated by motor 72, preferably reversible, for purposes of the blower 70 receiving powdered adsorptive particles of material from the housing 62 and discharging it through the outlet 74 which is interconnected to the lower inlet of the upstanding portion 90 of nozzle 88 by a simple conduit, not shown. Due to the oscillatable nature of the nozzle 88, it can readily be visualized from FIG. 1 that a substantial area of the body of water which is subtended by the booms 14 will receive a wide covering of the resinous particles generated by the unit 42 and blown from the forward end of the barge 10 unto a petroleum spill floating upon the aforementioned body of water. In addition, further powder of such nature also may be distributed from overhead by aircraft means, such as exemplary helicopters 104. Thus, as the tugboats 12 move the barge 10 forwardly to embrace an area of a petroleum spill encompassed at the sides at least by the booms 14, the spill, in effect, which is substantially stationary, will have the barge 10 moved toward it and thereby direct the floating spill toward the receiving ramp 106, details of which are best shown in FIGS. 3, 4 and 13.

RAMP AND MATERIAL DELIVERY UNIT

Figure 3:
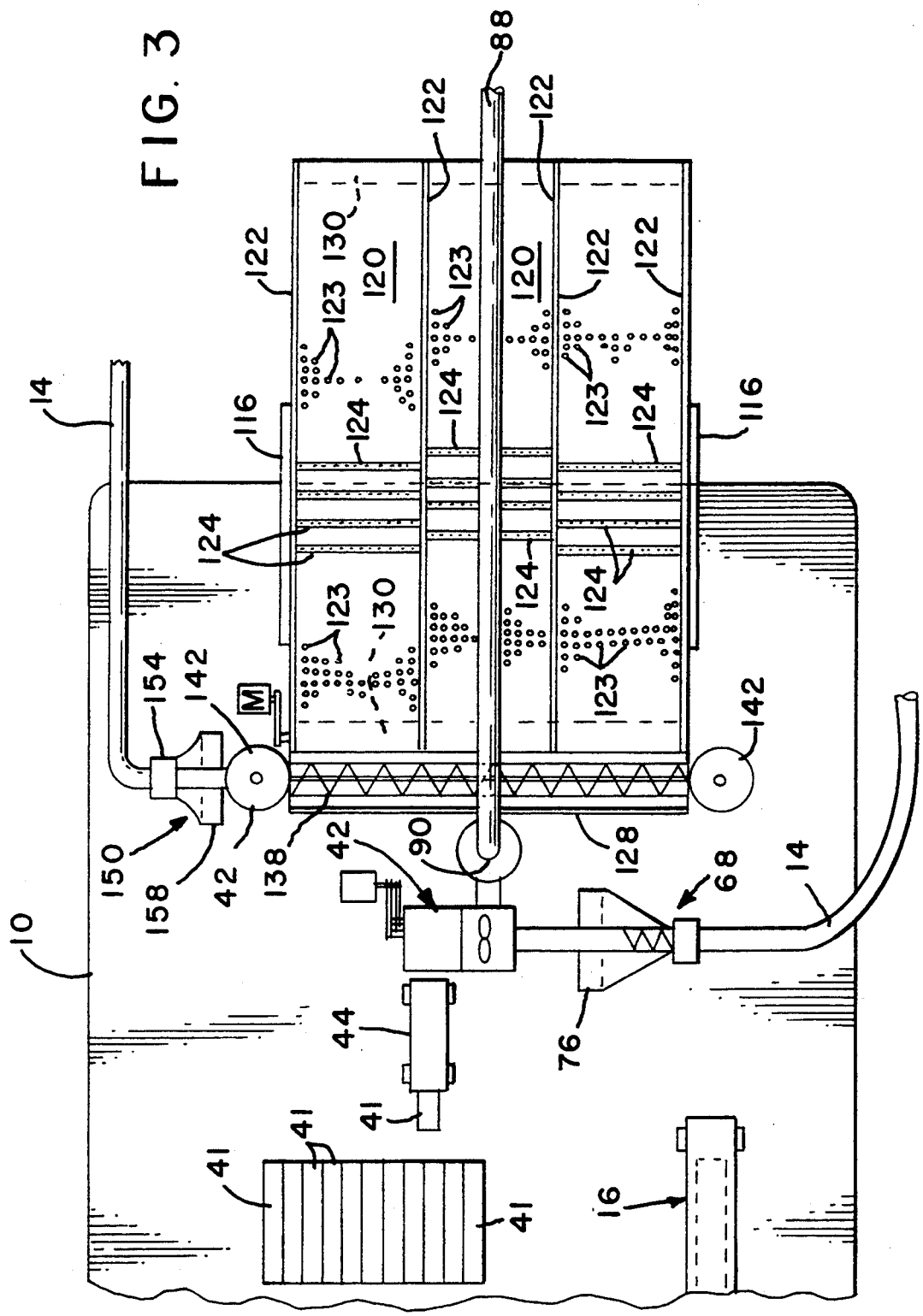
FIG. 3 is a section of the plan view of FIG. 1, shown on a larger scale than shown therein and in greater detail.
Figure 4:
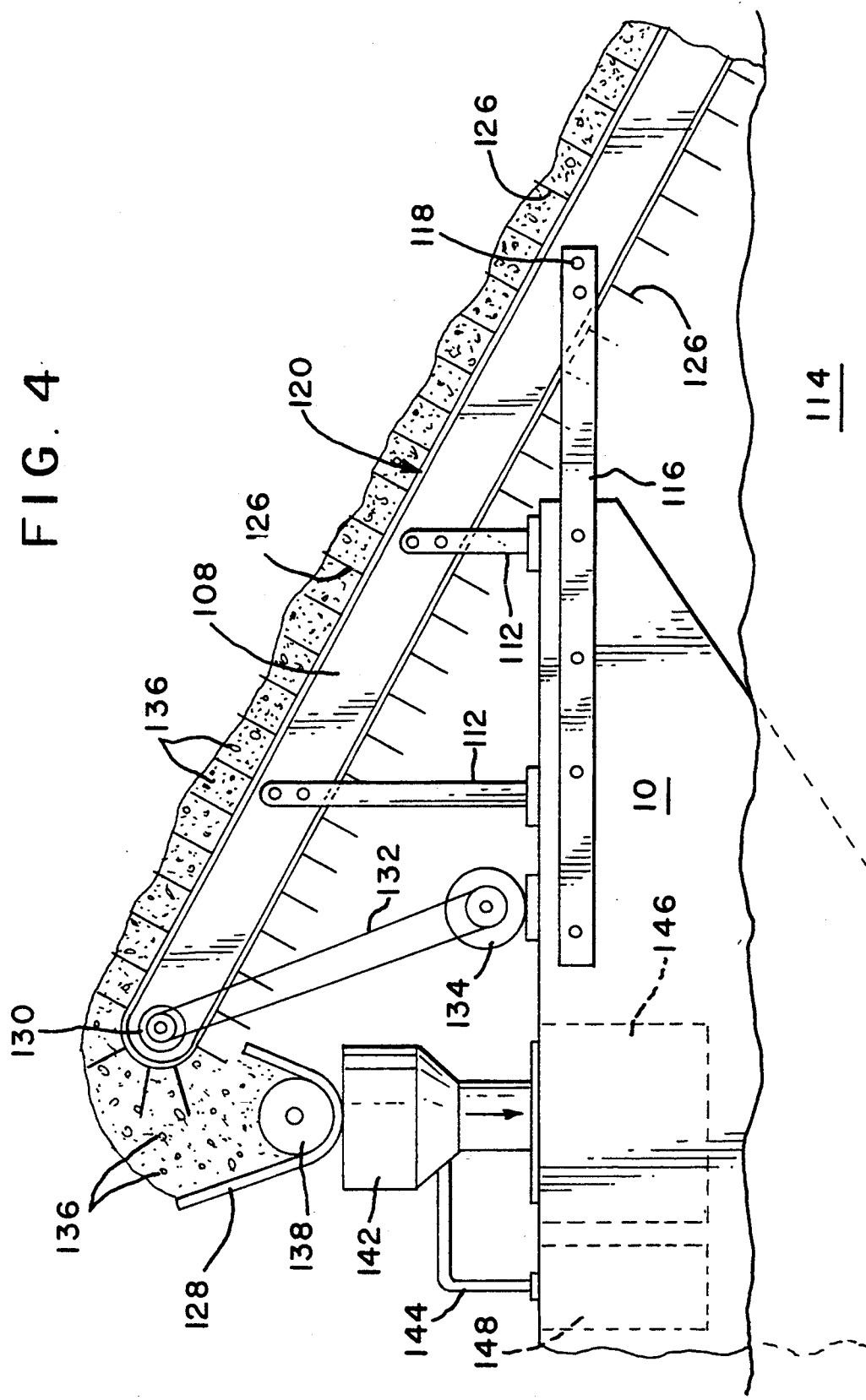
FIG. 4 is a fragmentary perspective view of details of FIG. 3 and illustrated on a still larger scale than in FIG. 3.
Figure 13:
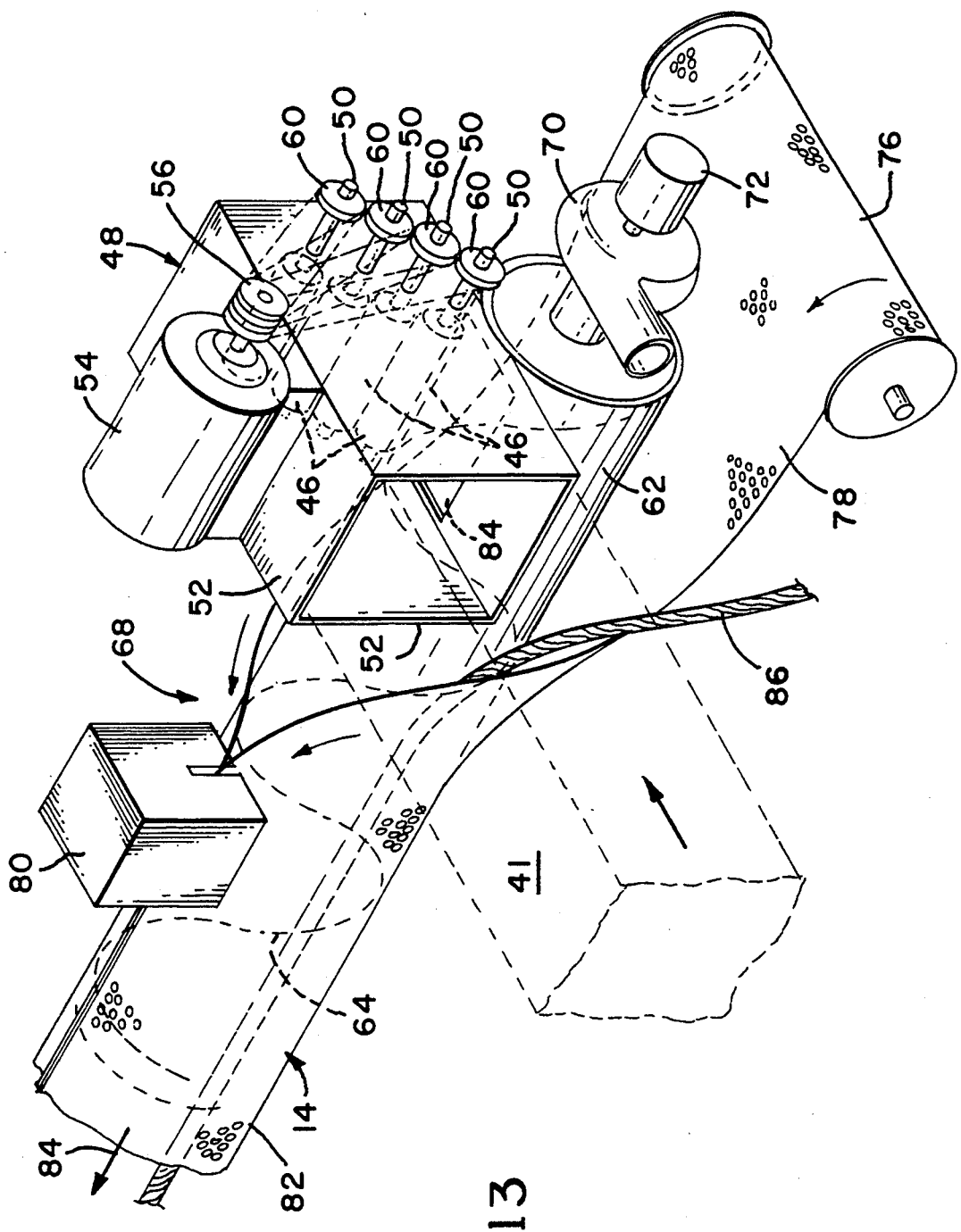
FIG. 13 is a fragmentary perspective view of the unit which forms the boom casing and filling unit of the invention.

As shown particularly in the aforementioned FIGS. 3, 4 and 13, there is supported by the forward end of the barge or scow 10, an inclined frame 108 which, in actual use, is supported by the deck 110 of the barge or scow 10, such as by the use of upright members 112 connected at the lower ends thereof to the deck 110, and the upper ends being connected to the opposite sides of the frame 108. The forward end of the frame extends beyond the forward end of the scow 10 and the forward end of said frame extends into the water 114, whereby the forward end of it will be beneath the spill floating upon the water 114. Additional connecting means comprising suitable beams 116 preferably are connected to opposite sides of the scow 10 and the forward ends project beyond the scow 10 and are connected by any suitable means, such as bolts 118, to the sides of the frame 108, it being understood that such beams respectively are connected to opposite sides of the frame 108, as well as the opposite sides of the scow 10.

Referring particularly to FIG. 3, it will be seen that the inclined frame 108 is relatively wide compared to the width of the scow 10, whereby it is capable of engaging and advancing an appreciable area of accumulated and saturated particles of the material which is distributed upon the spill referred to above and illustrated in FIG. 1. The frame 108 preferably supports a plurality of endless flexible conveyors 120 respectively each comprising at opposite sides thereof, endless flexible chains 122. As shown in FIG. 13, the frame 108 includes an upper perforated sheet 123. The perforations are relatively small, as of the order of not over an eighth inch in diameter, or less. The adjacent endless conveyors 120 are each composed of the flexible chains 122 at opposite edges thereof and extending between each pair of chains are a series of relatively shallow channels 124, the opposite ends of which are connected to the chains.

Connected to and extending upward from each channel is a row of spaced pins or prongs 126. The pins or prongs 126 are readily adapted to engage a layer of saturated particles of the aforementioned powder which have adsorbed the petroleum from the surrounded area of slick and movement of the scow 10 by the tugboats 12 causes movement of the saturated particles toward the ramp 106 which, by extending at its forward end below the floating material, will engage said layer from beneath by means of the pins or prings 126, will advance the mass of the material up the ramp and discharge it at the upper end thereof into a receiving trough 128. As clearly shown in FIG. 4; the endless conveyors 120 at opposite ends thereof, are supported upon rotating members 130 and the uppermost members are driven by a belt or chain 132, which extends around a gear or pulley of an electric motor 134 on deck 110.

As the mass of saturated material 136 is advanced up the incline of frame 108 and reaches the top, it automatically breaks off in gobs or chunks into the trough 128 and the material then is engaged by an auger 138 which, as shown in exemplary manner in FIG. 13, is rotated by a preferably reversible electric motor 140. Mounted respectively adjacent opposite ends of the receiving trough 128 and auger 138, are relatively high-capacity centrifuge units 142, which are driven in conventional manner by appropriate power means, such as an electric motor mounted therein and not shown in the drawings.

When the auger 138 is driven in one direction, the spiral thereof is such that it will feed the broken chunks and pieces of saturated particles 136 toward one of the centrifuge units 142 as can be visualized from FIG. 3, while the other centrifuge remains in standby. If desired, as can be seen from FIG. 4, the centrifuge has a discharge 144 for petroleum, while the powder material from which the petroleum has been separated is discharged from the centrifuge into a suitable receptacle 146, which, for example, is shown in phantom in FIG. 4 and can be located in the hold of the scow 10, while the recovered petroleum exits from discharge member 144 into the second receptacle 148, which for convenience, can either be in the hold of the scow 10 or in a tanker or otherwise disposed adjacent the scow.

By way of example, but without restriction thereto, the endless conveyors 120 of the several sets thereof may be of the order of six feet wide, whereby if there are three such conveyors in side-by-side relationship, the overall width of the receiving ramp 106 may be of the order of approximately eighteen feet. Such a ramp will accommodate a substantial amount of material to be serviced by the centrifuge to which it is directed. Due to the motor 140 preferably being of reversible nature, if one of the centrifuges becomes unserviceable for any reason, the other one readily can be placed in operation to move the saturated material to the opposite end of the auger for delivery to the centrifuge 142.

As a means of practical operation of the petroleum recovery system comprising the present invention, the illustrated two sections of the boom 14 which also has been referred to as tube 82 hereinabove, and which contains the aforementioned particles of resinous material that will absorb the petroleum slick as the boom encounters it, or vice versa, practical operation of the system would somewhat dictate that a particle-filled perforated or porous tube 82 which comprises the booms 14, can remain floating for a substantial period of time, such as a number of weeks or even possibly several months while the scow 10 is moved forward by the tugboats 14 and progressively subtend areas of the floating slick continuously, which is progressively delivered to the receiving ramp 106 and from there progressively is delivered to one or the other of the centrifuges 142. After a certain period of operation, such as described herein, it becomes desirable to remove the saturated particles from the tube 82 of the booms 14 and this is accomplished by the boom-emptying unit 150, illustrated in perspective in FIG. 14.

BOOM-EMPTYING UNIT

As shown in FIG. 14, the boom-emptying unit 150 receives one end of the filled and saturated boom 14, moves it over a support, such as a roller 152, while the tube or casing 82 thereof passes beneath a slitter unit 154, which incises the tube 82 longitudinally at the top of it. As it passes over roller 152, the mass of saturated material 136 tends to spread the opposite edges of the slit tube 82 away from each other, whereby the material 136 is free to pass down the guide chute 156 into the centrifuge 142 from which the separated petroleum exits through discharge 144 and the adsorbing particles from which the petroleum has been extracted, discharge, for example, from the lower end of centrifuge unit 142, as clearly shown in FIGS. 14 and 15.

It will be seen also from FIG. 14 that the slit tube 82 may be coiled upon a reel or drum 158, while the cable 86 is coiled upon spool 160. For example, the upper edge of the guide chute 156 may comprise a scraper edge 162 to relatively adequately clean the saturated material 136 from the now sheet-like tube 82 prior to it being coiled upon the drum 158. When in this condition, the roll of the tube material 82 is in condition to be directed to the boom-forming unit 68 and be restored to tubular configuration for further use.

Figure 15:
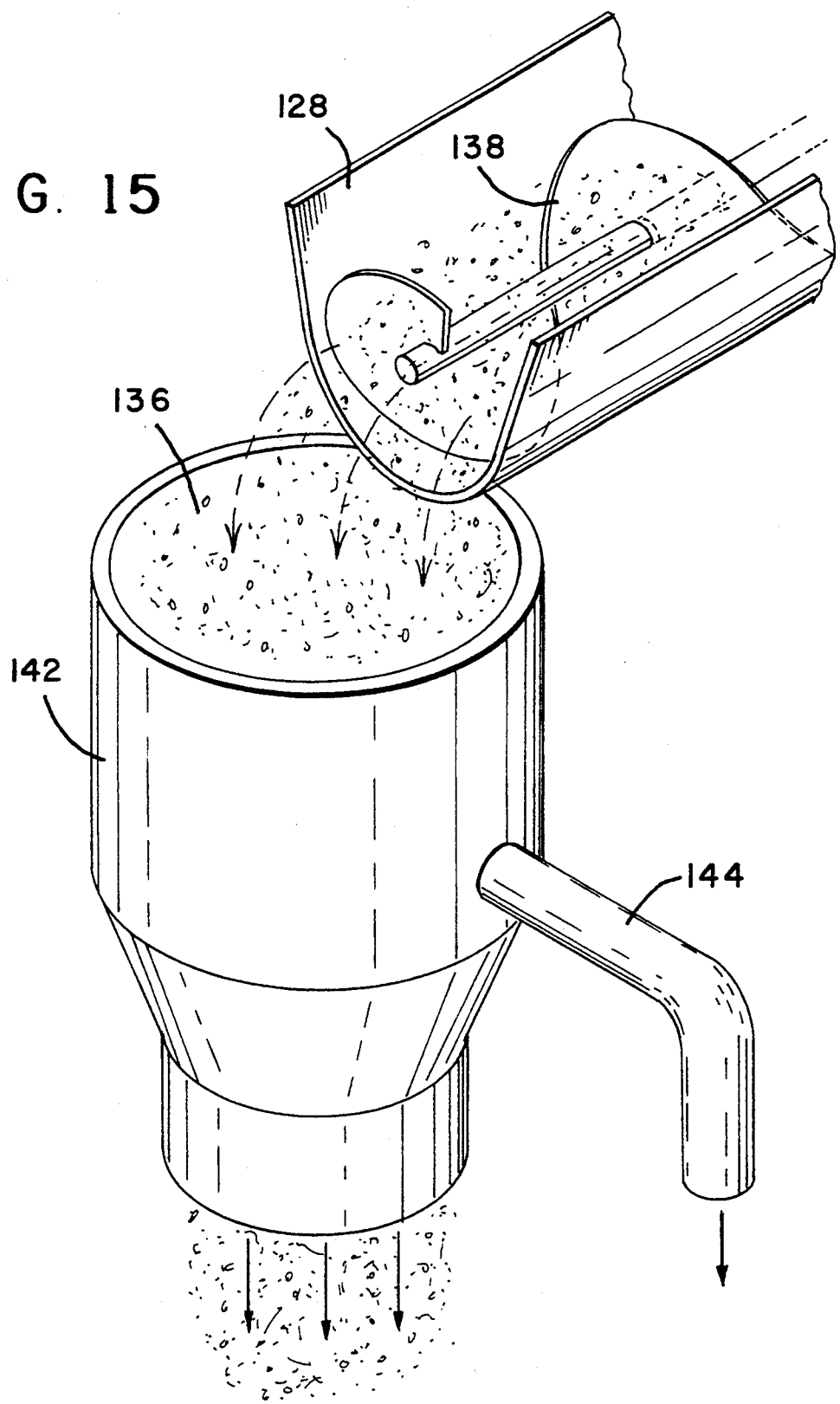
FIG. 15 is a fragmentary perspective view of delivery of petroleum-adsorbed particles to a centrifuge.

Hereinabove, reference has been made to the fact that one of the centrifuges may serve as a standby and, as illustrated in FIG. 15, one of such centrifuges is shown in position to receive saturated particle material 136 from the receiving trough 128 as delivered to one of the opposite ends thereof, as shown in FIG. 3, by auger 138. It, thus, will be seen from FIG. 3 that a reversible motor, not shown, is connected to the shaft of the auger 138 conveniently and may be operated selectively to deliver the saturated material 136 to either of the two centrifuges 142, as desired.

Figure 16:
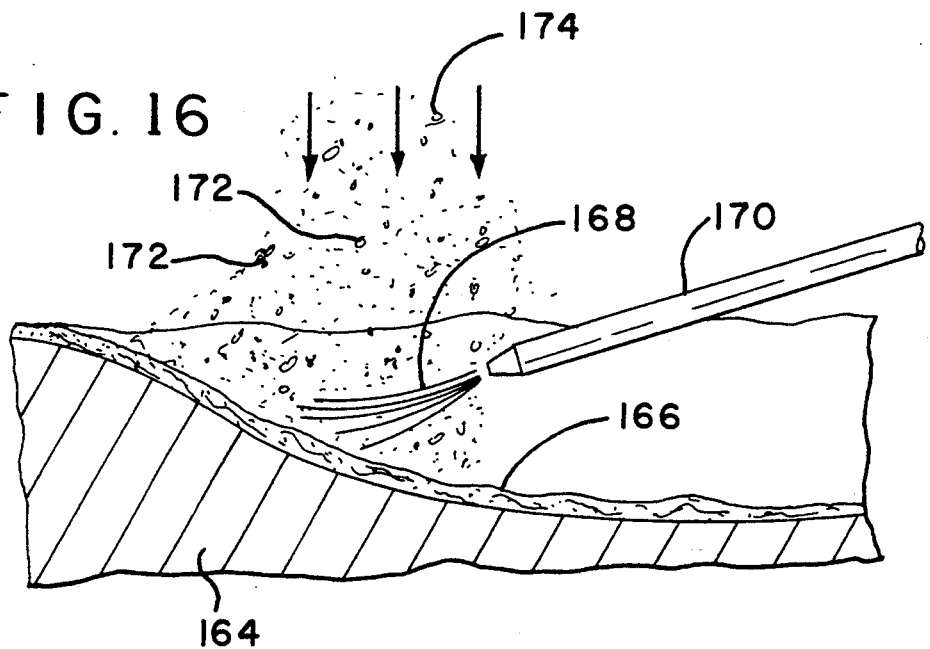
FIG. 16 is a fragmentary sectional view illustrating salvage of a petroleum layer from a bed or shore of a body of water.
Figure 17:
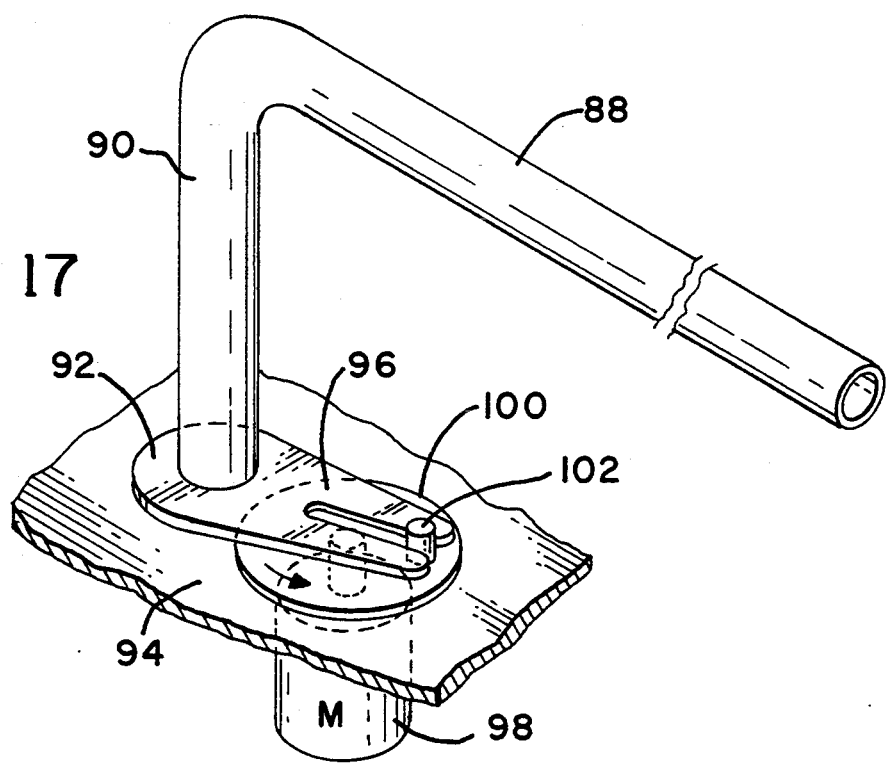
FIG. 17 is a fragmentary perspective view of mechanism by which a large particle-delivery nozzle is oscillated.

Depending upon the action of the water upon which a petroleum slick is disposed, it is highly possible for action of waves of the water upon the slick to dispose the same on an adjacent shore or, if the slick has been on the water a sufficient amount of time, it may sink to the bed of the body of water. Such material has value and recovery of the same is desirable. Hence, in accordance with the present invention, as illustrated in exemplary manner in FIG. 16, wherein the bed 164 of a body of water is shown, the slick 166 is lying thereon. Such disposed slick may be agitated, such as by a jet 168 of water discharged from a nozzle 170, for example, as shown in FIG. 16, and thereby tend to break up the accumulated slick 166 into particles 172 of various sizes. By blowing or distributing particles of the above-mentioned powder 174, such powder will unite with the particles 172 of the slick and become saturated thereby and render the particles floatable upon the water and thus, can be recovered, such as by a section of the boom 14 encircling the same and delivering it to the above-described apparatus, as appropriate.

In addition to the auger 64 being operable by motor 67, which is reversible and is supported by one end of the housing for auger 64, the shaft 176 of auger 64 also extends through an appropriate auxiliary housing 178 that is affixed to one end of motor 67 for support thereby. The purpose of providing reciprocation of the auger by shaft 176 is to permit it to function somewhat as a piston incident to loading the porous tube 82 with the adsorptive particles of powder and to prevent jamming of powder within the tube which, when filled, comprises the boom 14. The housing 178 supports a small gear 180 that is affixed to the shaft of motor 67. Gear 180 meshes with larger diameter gear 182 that has a key, not shown, which reciprocates in the spline 184 in shaft 176 incident to the shaft 176 and the auger being reciprocated by a double-acting hydraulic cylinder 186.

The opposite ends of the cylinder 186 have conduits 188 and 190 connected thereto and extend to a suitable conventional supply of hydraulic fluid and control mechanism, neither of which are shown in FIG. 9 since they are of standard type. Also shown in FIG. 9 is a longitudinal support 192 which is rigidly affixed to one end to and extends horizontally from the housing 62. The outer end of support 192 has a pivot pin that pivotally supports the lower end of rocker arm 196.

Intermediately of the arm 196, it is pivotally connected to the outer end of piston rod 198, which projects from one end of cylinder 186 and the opposite end of said cylinder preferably is pivotally connected to housing 62 by pivot pin 194. The upper end of rocker arm 196 supports a thrust bearing 200, which also is provided with limited movement transverse to the axis of shaft 176 and thereby accommodates the pivotal movement of the rocker arm 196 relative to the fixed axis of shaft 176. Though not specifically illustrated in the drawings, it will be understood that appropriate supports for the mechanism other than that illustrated and described above, are intended to be utilized in accordance with sound engineering principles.

From the foregoing, it will be seen that the present invention provides various units all separable in conjunction with each other effectively to recover petroleum from a spill thereof floating upon a body of water or disposed upon the bed of said body or the adjacent shore.

It will also be seen from the foregoing that the system and apparatus comprising the present invention essentially is a relatively complete arrangement for recovering petroleum spills either floating upon a body of water or disposed upon the bed thereof or a shore of the body. The system primarily comprises a unit 16 by which a porous block of synthetic resin is formed into powder particles that are adapted to adsorb petroleum as it engages it, not only by the phenomenon of adsorption but also by a strong inherent affinity for the particles to strongly bond to the petroleum to such a degree that high-powered centrifugal force is required to recover the petroleum from the particles. Blocks or units of the resin material are disintegrated by the unit 42 into particles of a size in the range of between one-sixteenth and one-eighth of an inch, for example, and the quantity of said material is enclosed within a tube 82 of synthetic resin, preferably of thermoplastic nature and edges of a sheet of said material are adapted to be connected to form such tube either by heat or stitching, for example. The shredded powder material, when introduced into the tube by the boom-forming unit 68, produces an indefinite length of boom 14, said booms also contain for pulling strength, a cable 86 having a diameter of the order of approximately three-fourths to one inch and formed, for example, from metal strands or synthetic resin, such as sold under the tradename "NYLON". Inclusion of such cable within the boom provides tensile strength adequate to permit the boom to serve as towing means between a floating scow or barge upon which various units of the invention are mounted for operation, such boom extending between the barge and exemplary tugboats by which a pair of such booms respectively can be pulled into a floating mass of petroleum spill for recovery thereof.

Attached to the forward end of the barge or scow is an inclined ramp which reaches beneath the level of the spill and extends above it and is provided with conveyor means highly adequate to engage and propel masses of adsorbed petroleum in synthetic resin powder material for delivery to a centrifuge unit which operates to separate the petroleum from the powder material and thereby recover the petroleum, while the powder material may be reused for further adsorption, such as spraying the same upon additional areas of the spill or encased within the porous tubing which comprises a boom and is capable of adsorbing areas of a spill when contacting the same and, ultimately, petroleum-saturated powder within the boom may be recovered by slitting the tube or casing of the boom, discharging the contents to a centrifuge, and then the porous material, which usually is rolled when emptied of the saturated particle material, may be reformed into a tube and, when refilled with unsaturated or new particle material, may be reused to serve as a boom.

Due to the fact that the inherent attracting force of the specifically described particles for petroleum is such that only very strong centrifuging force is required to separate the saturated particles into petroleum and powder, the present system of reclaiming petroleum from spills is efficient and effective when operating the centrifuge between 10,000 and 20,000 r.p.m.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

We claim:

1. A method of reclaiming petroleum from oil spills or slicks disposed on bodies of water comprising the steps of:
   a. preparing a mixture of polyurethane, a catalyst and a polyquaternary amine to form a powder mixture with powder particles having a positive charge which attracts petroleum and strongly bonds it to said particles;
   b. substantially filling a porous tubular sleeve with said powder particles capable of physically attracting and adsorbing petroleum floating on a body of water to form a boom;
   c. disposing said tubular sleeve and enclosed particles on said body of water and subtending at least a portion of an oil slick or spill with said boom;
   d. permitting said particles to adsorb and bond to petroleum in said oil slick or spill;
   e. moving said particles with adsorbed petroleum therein from said oil slick or spill to a discharge station, and;
   f. subjecting said powder particles with adsorbed petroleum to centrifugal forces of sufficient strength to break the bond between said powder particles and adsorbed petroleum, thereby physically separating the petroleum.

2. The method according to claim 1 further including the step of dispersing a quantity of said powder particles loosely on the oil slick or spill which is subtended by said boom and permitting said dispersed particles to attract and bond said petroleum to said loose floating powder particles.

3. The method according to claim 2 further including the steps of collecting and subjecting the dispersed powder particles with adsorbed and bonded petroleum thereon to centrifugal forces of sufficient strength to separate said petroleum from said particles, and separately collecting said petroleum and particles.

4. The method according to claim 1 further including the step of reintroducing separated particles from which petroleum has been removed into a porous tubular sleeve and disposing said sleeve and enclosed particles into an oil slick to adsorb additional petroleum.

5. The method according to claim 4 further including the step of distributing said particles from which petroleum has been removed to an oil slick and permitting them to adsorb additional petroleum from said slick.

6. The method according to claim 1 including a preliminary step of forming a solid block, which is to be shredded to form said powder mixture, including introducing liquid polyurethane, a catalyst and polyquaternary amine into a confined space of suitable size to permit the elements to react and foam thus forming a shaped block of solid foamed resin material and shredding the block of solid foamed resin material to thereby form said powder mixture.

7. The method according to claim 6 including the step of shredding said block by rotary saws of which the teeth of alternate saws are moving adjacent each other in the same directions while one end of said block is fed toward said saws for disintegration into adsorbable particles having properties which attract and bond to petroleum.

8. The method according to claim 1 in which said powder particles are fed into said sleeve while the sleeve is being formed progressively from a roll of porous thermoplastic material and forcing said particles into said sleeve by means of a rotating and reciprocating auger.

9. The method according to claim 1 further including the the step of feeding said boom and adsorbed petroleum therein to conveyor means adjacent said discharge station, and progressively transferring said powder and adsorbed petroleum therein from said boom onto said conveyor means to deliver the power and adsorbed petroleum to a centrifuge.

10. The method according to claim 9 further including the step of opening said sleeve as it progressively reaches said conveyor to permit discharge of the particles and adsorbed petroleum to said conveyor for feeding thereof to said centrifuge.

11. The method according to claims 9 further including the step of distributing powder particles onto the area of said slick subtended by said boom for adsorption of the boom subtended portion of said slick, moving said boom toward a selected portion of said slick such that the subtended area of particles and adsorbed petroleum are progressively moved to said conveyor for delivery of said particles to said centrifuge, whereby all of the powder and adsorbed petroleum in the subtended area as well as the particles within the boom are delivered to the centrifuge for separation of the petroleum from the powder particles to recover the petroleum and render the powder particles suitable for reuse.

12. The method according to claim 1 wherein the boom formed is endless, and is separated at a desired location to form two ends before being progressively fed to said discharge station.

* * * * *